United States Patent

Chand

[15] 3,639,125

[45] Feb. 1, 1972

[54] PROCESS FOR PRODUCING PHOTOGRAPHIC RELIEF PATTERNS

[72] Inventor: Nirmal Chand, South Burlington, Vt.

[73] Assignee: International Business Machines Corporation, Armonk, N.Y.

[22] Filed: Jan. 10, 1969

[21] Appl. No.: 790,334

[52] U.S. Cl. .......................................96/35, 96/36, 96/36.2, 96/59, 117/38, 117/46 CA

[51] Int. Cl. ..........................................................G03c 5/00

[58] Field of Search ...................96/35, 36, 36.2, 59; 117/38, 117/46 CA

[56] References Cited

UNITED STATES PATENTS 1,857,089 5/1932 Sease .....................................96/59 X

FOREIGN PATENTS OR APPLICATIONS 549,463 11/1942 Great Britain .............................96/35

697,036 9/1953 Great Britain .............................96/36

OTHER PUBLICATIONS

Focal Encyclopedia of Photography, Vol. II, p. 1297, (1965)

*Primary Examiner*—Norman G. Torchin
*Assistant Examiner*—John Winkelman
*Attorney*—Hanifin and Jancin and Willis E. Higgins

[57] ABSTRACT

A process for producing photographic patterns on a substrate, such as a glass photographic mask, in which a heating step is used to selectively remove areas of a gelatin coating on a substrate. After a developed silver image is formed in the gelatin coating, a silver-removing reagent is applied to the coating to remove the silver from the exposed (image) areas of the coating. The coating is then heated at a temperature of at least 250° C. to remove the silver-free areas of the gelatin coating from the substrate and to harden the remainder of the coating. A reversal process is also disclosed.

9 Claims, 7 Drawing Figures

INVENTOR.
NIRMAL CHAND

BY Willis E. Higgins

ATTORNEY

PROCESS FOR PRODUCING PHOTOGRAPHIC RELIEF PATTERNS

FIELD OF THE INVENTION

This invention relates to processes for producing photographic patterns on a substrate. More particularly, it relates to a process for making masks which may be used in the exposure of photosensitive polymeric coatings or photoresists in the fabrication of microelectronic semiconductor devices, such as integrated circuits, printed circuits, and the like.

CROSS-REFERENCE TO RELATED APPLICATION

This invention is an improvement in processes of the type described in the commonly assigned Chand application Ser. No. 650,804, filed July 3, 1967. As discussed in that application, both the image resolution tolerance requirements and the necessity to avoid defects in the transparent area of masks used in the manufacture of semiconductor devices are very critical. That application represents a substantial advance over the prior art conventional photographic techniques discussed there for preparing masks. The process claimed there yields a high resolution mask in which gelatin has been eliminated from the transparent areas of the mask, thus eliminating the problem of gelatin defects in the transparent areas, while maintaining a mask resolution of the high quality necessary to meet the stringent demands of semiconductor device fabrication.

In that process, a developed silver image is formed in a gelatin coating on a glass plate. The coating is then heated to a temperature of at least 250° C. A gelatin-removing liquid, such as a hypohalite bleach, is then used to remove selectively the nonimage or transparent areas of the gelatin coating. The heating step acts to make the image areas of the gelatin coating more resistant to the action of the gelatin-removing liquid than the nonimage areas.

The use of a gelatin-removing liquid, which is based on selective chemical attack or etching, will produce some removal of the more resistant material not desired to be removed by the chemical attack or etching operation. If too much of the more resistant material is removed, there is a possibility that an otherwise acceptable mask will not meet dimensional requirements for making microminiature semiconductor devices as a result of this change in the image dimensions produced near the end of the mask fabrication process. Careful use of the gelatin-removing liquid will prevent masks from being made unacceptable by excessive attack on the image-containing gelatin. However, there remains a potential for obtaining an even more precise image in a process of this type, if the necessity to use a gelatin-removing liquid after the baking step may be eliminated.

SUMMARY OF THE INVENTION

Accordingly, it is an object of this invention to make more precise images in processes for producing patterns on a substrate in which an image-containing gelatin coating is heated to harden the image.

It is another object of the invention to provide a method, which does not require chemical attack or etching once a desired image if formed, for the selective removal of nonimage areas of a gelatin coating on a substrate while leaving the image-containing areas of the gelatin intact on the substrate.

It is a further object of the invention to eliminate the necessity for further chemical treatment to remove nonimage areas of the gelatin coating after heating the coating in processes for producing photographic masks in which an image-containing gelatin is heated to harden the image.

These and other related objects may be attained by using the chemical reversal and heating process of the present invention for producing photographic patterns on a substrate. The process begins with the step of forming a developed silver image in a gelatin coating on the substrate. A silver-removing reagent is then applied to the coating to remove the image from the exposed area of the coating. Such a reagent does not remove the silver halide capable of forming an image from the unexposed areas of the coating. An image may then be formed in the remaining unexposed area of the gelatin coating by exposing it to light or contacting it with a suitable reagent. Alternatively, this step may be omitted. The process is completed by heating the coating at a temperature of at least 250° C. to harden the image-containing area of the coating and to remove the image-free or transparent areas of the coating from the substrate. If the step of forming an image in the unexposed area of the coating is not carried out, the heating step itself will darken the unexposed area of the coating sufficiently to form an image suitable for most purposes. As used herein, the term "image containing area of the coating" includes areas in which an image is not made visible until the heating step.

While applicant does not wish to be bound by any particular theory of operation, it is believed that the silver-removing reagent, which carries out the chemical reversal portion of the process, affects the gelatin coating in such a way as to enable the nonimage areas to be removed by heating. It is believed that the silver-removing reagent reduces the thickness of both the image-containing areas and the image-free areas, but decreases the coating thickness to a greater extent in the image-free areas. Thus, when the gelatin coating is then heated, complete removal of the gelatin in the image-free or transparent areas may be carried out while maintaining the image-containing coating on the substrate. In fact, the heating operation acts to harden the image-containing areas of the coating and thus make them harder to remove from the substrate. The result is that no gelatin-removing liquid needs to be applied to the coating after the heating operation to remove gelatin from the image-free areas. In contrast, the process described in the above-mentioned copending Chand application requires the use of a gelatin-removing liquid. If the heating temperature is increased in the process there described for the purpose of attempting to remove all of the gelatin from the image-free areas, the result is to burn away the image-containing areas of the coating as well. Thus, the use of a chemical reversal or silver-removing reagent in combination with the heating step permits selective removal of the gelatin coating from the image-free areas, while maintaining the image intact in the image-containing areas of the coating.

The process of this invention is particularly suited for making glass masks used in the manufacture of semiconductor devices. However, the ease of carrying out the present process and the very high resolution obtained for the resulting patterns make the process suitable for making essentially any photographic pattern on essentially any substrate which is capable of withstanding the elevated temperatures required for the heating operation. By eliminating the necessity for the use of reagents which chemically attack or etch the gelatin coating after the heating operation, the process is capable of producing a substantial improvement in the precision of patterns produced. The process assures that the image formed by the initial exposing and developing will not be subject to dimensional change as a result of later chemical attack or etching.

The foregoing and other objects, features, and advantages of the invention will be apparent from the following more particular description of the preferred embodiments of the invention, as illustrated in the accompanying drawings.

DESCRIPTION OF THE PREFERRED EMBODIMENTS

Figure 1:
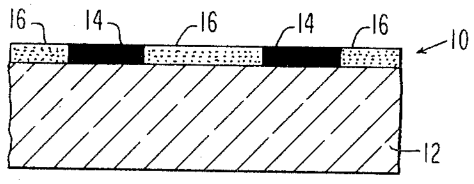
FIGS. 1–4 are cross-sectional views of a portion of a glass mask during fabrication in accordance with the invention.

Referring now to the the drawings, more particularly to FIG. 1, there is shown a cross section of a gelatin coating 10 on glass plate 12 at the completion of the first step in the fabrication process. Areas 14 of gelatin coating 10, which contains a lightssensitive silver halide emulsion, have been exposed to light and developed to convert the silver halide in areas 14 to metallic silver, thus producing a darkened image. Areas 16 of the gelatin coating have not been exposed to light and still contain the silver halide emulsion. These areas of the gelatin appear transparent in the actual coating. The silver halide is desirably silver chloride, bromide, or iodide, with silver bromide being preferred.

Figure 2:
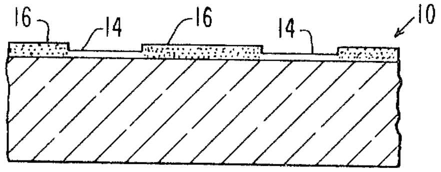

FIG. 2 shows the same emulsion coating 10 on glass plate 12 after it has been subjected to the action of a chemical reversal or silver-removing reagent. As shown, exposed areas 14 of the coating 10 have been rendered transparent due to the removal of the metallic silver shown in these areas in FIG. 1. The action of the silver-removing reagent is also shown to have reduced the thickness of the coating 10 in the areas 14. The unexposed silver halide in the areas 16 of the coating is not affected by the chemical reversal or silver-removing reagent, although the thickness of these areas in the coating 10 is also reduced somewhat. Suitable examples of such chemical reversal or silver-removing reagents include aqueous solutions of an acid, such as sulfuric acid or citric acid, and an oxidizing agent, such as potassium dichromate or hydrogen peroxide, aqueous solutions including a copper salt, an organic acid, and an oxidizing agent, such as aqueous solutions of cupric chloride, citric acid, and hydrogen peroxide; copper sulfate, citric acid, potassium bromide, and hydrogen peroxide; cupric chloride, citric acid, urea, and hydrogen peroxide; and the like. Detailed information on chemical reversal reagents and their use may be found in "Techniques of Microphotography," Kodak Publication No. P–52 (Eastman Kodak Company, Rochester, N.Y., 1964), and "Kodak Formulas for the Graphic Arts," Kodak Pamphlet No. Q–11 (Eastman Kodak Company, Rochester, N.Y., 1956).

Figure 3:
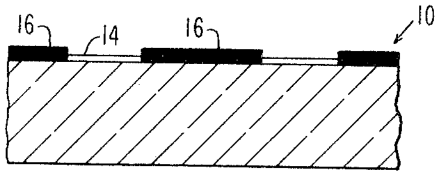

FIG. 3 shows the gelatin coating 10 on glass plate 12 after at least areas 16 have been exposed to light and developed. This exposure and development converts the silver halide in the originally unexposed area 16 of the coating 10 to free silver, thus forming a darkened image of the same type as formerly present in the originally exposed areas 14 of the coating 10. The darkened image may also be formed by contacting the unexposed areas 16 of the coating 10 with a chemical reducing agent capable of reducing silver ion to silver metal, such as hydroquinone, Metol, sodium hydrosulfite, stannous chloride, and the like.

Figure 4:
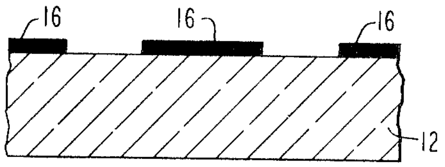

FIG. 4 shows the completed mask formed by heating the coating 10 at a temperature in excess of 250° C. The transparent areas 14 of the coating as shown in FIG. 3 have been completely removed by the heating operation. The image-containing areas 16 of the coating 10 have been hardened and are thus more difficult to remove from the surface of glass plate 12. Since only the heating operation is required to remove the nonimage areas 14 from the mask, no attack on image areas 16 results. For best results, temperatures in excess of 300° C. are desirable for the heating step, with the temperature range of about 375° C. to about 425° C. being most preferable. The higher temperatures allow a shorter time for the heating operation. The heating may be conducted in an oven having an inert atmosphere, such as nitrogen, or in a circulating air oven.

Figure 5:
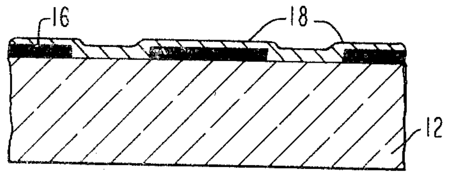
FIGS. 5–7 show further fabrication steps which may be used to produce a different type of mask using the invention.
Figure 6:
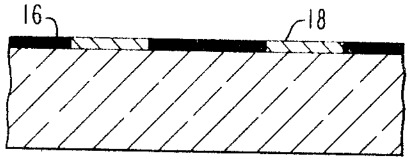
Figure 7:
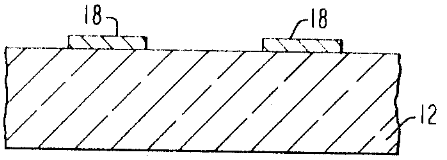

Further steps may be carried out on the mask shown in FIG. 4 to produce a so-called additive chrome mask. As shown in FIG. 5, a layer 18 chromium of about 1,000 angstroms thickness may be deposited by vacuum sputtering or evaporation over the mask as shown in FIG. 4. The mask may then be immersed in a chromium-removing liquid, such as aqueous sodium hypochlorite, for a period sufficient to remove the chromium layer 18 from only the image areas 16 of the mask, as shown in FIG. 6. The chromium displays much greater adhesion to the glass plate 12 than to the gelatin coating 16 in the image areas. Therefore, the chromium is removed at a much greater rate from the gelatin than it is from the glass. The removal of the chromium from the nonimage areas 16 may be observed by reemergence of the dark image areas 16, as shown in FIG. 6. The mask may then be immersed in a 10 per cent weight aqueous solution of nitric acid, which removes the gelatin image from the image areas 16 to provide the structure shown in FIG. 7, which is a completed chrome mask with chromium 18 overlying glass plate 12.

The following nonlimiting examples further describe preferred embodiments of the present invention:

EXAMPLE I

A commercially available Kodak High Resolution Plate, obtained from the Eastman Kodak Company, Rochester, N.Y., having a layer of about 5 microns thick of a negative gelatin emulsion of predominately silver bromide and a trace of silver chloride, with a grain size in the order of 0.01 to 0.1 microns diameter, coated on a glass plate 6 microns in thickness is exposed to an image used to make an array of microelectronic semiconductor devices. The image is then developed in accordance with the detailed procedure set forth in "Techniques of Microphotography," Kodak Publication No. P–52 (Eastman Kodak Company, Rochester, N.Y., 1964), pages 45–47, using a developer consisting of 90 g. desiccated sodium sulfate, 45 g. hydroquinone, 37.5 g. sodium hydroxide (caustic soda), 30 g. potassium bromide, in 1,750 ml. of water. A chemical reversal solution consisting of 9.5 g. potassium dichromate and 12 ml. sulfuric acid in 1,000 ml. of water is then used to remove the silver image from the exposed areas, without affecting the unexposed silver halide. The plate is then exposed to light and developed again with the above developer formulation, to convert the silver halide in the previously unexposed areas of the plate to metallic silver. After completing the process as described in the above Kodak publication, the plate is ready for heating.

The plate is heated in a forced air oven at 400° C. for 15 minutes. Microscopic examination of the plate shows that all gelatin has been removed from the nonimage areas and that no removal of gelatin from the image-containing areas has taken place. The image-containing gelatin has been hardened and contains a high resolution image suitable for use in making an array of microelectronic semiconductor devices.

EXAMPLE II

The procedure of example I is repeated, except that the plate is heated after application of the potassium dichromate-sulfuric acid chemical reversal solution without reexposure to light and the second development. Microscopic examination of the plate shows that all gelatin has been removed from the nonimage areas and that the areas of the coating containing unexposed silver halide are intact. The areas of the coating containing unexposed silver halide are hardened and assume a deep red color to form a high resolution image of the semiconductor array patterns.

EXAMPLE III

The procedure of example I is repeated, but with use of a Kodalith Type III plate having a predominantly silver chloride emulsion in the gelatin coating. The same selective removal of the gelatin coating from the nonimage areas as in example I is observed.

EXAMPLE IV

The procedure of example I is repeated, but using different temperatures and times for the heating step. Complete removal of the gelatin from the nonimage areas and a sharp, high resolution image results when plates are heated at 300° C. for 25 minutes, 350° C. for 20 minutes, and 450° C. for 7 minutes. If the plates are heated at a temperature less than 250° C., incomplete removal of the gelatin from the nonimage areas occurs.

For comparative purposes, a Kodak High Resolution Plate exposed and developed in accordance with the procedure described in the above-mentioned copending Chand application (i.e., in which no chemical reversal solution is used) is heated to cause complete removal of the gelatin coating from the nonimage areas, rather than using a gelatin removing liquid. It is necessary to heat the plate at 400° C. for 25 to 30 minutes in order to cause complete gelatin removal from the nonimage areas. This results in removal of most of the image as well. Lower temperatures or shorter heating times maintain the image intact, but do not allow complete removal of the gelatin from the nonimage areas.

EXAMPLE V

A layer of about 1,000 angstroms thickness of chromium is sputter deposited over a plate prepared by the procedure of example I. The plate is then immersed in aqueous sodium hypochlorite for a time sufficient to remove the chromium from only the image areas. The chromium displays much greater adhesion to the glass plate in the nonimage areas than to the gelatin coatings in the image areas. Therefore, the chromium is removed at a much greater rate from the gelatin than it is from the glass. Following complete removal of the chromium from the image areas, the plate is immersed in a 10 percent by weight solution of nitric acid to remove the gelatin image from the image areas and leave the chromium adhering to the former image-free areas of the mask. The nitric acid solution is used instead of sodium hypochlorite to remove the gelatin image because the sodium hypochlorite would also remove the chromium from the former image-free areas. The resulting additive chrome mask may be utilized in semiconductor fabrication as a high resolution mask.

While glass is the preferred material for the substrate when a photographic mask is to be made, other transparent materials having softening points above 250° C., such as plastics which are unaffected by the temperatures employed in the heating step of the invention, may be used. For other purposes, nontransparent substrates may also be used.

With respect to the chrome mask formation, other metals may be deposited in place of chromium in accordance with the same procedure. Such metals include nickel, tin, aluminum, and gold. These metals display a greater adhesion to glass than to the gelatin image areas and may readily be removed from the gelatin image areas without removing them from the glass areas.

It should now be apparent that an improved process for producing photographic patterns on a substrate capable of carrying out the stated objects of the invention has been provided. Since no chemical reagent or etchant is necessary in the process of this invention after the gelatin coating has been heated, attack on the image areas of the coating from such reagents is eliminated, resulting in better control of image dimensions. For this reason, the process is of particular value for producing masks used in the fabrication of semiconductor devices.

While the invention has been particularly shown and described with reference to the preferred embodiments thereof, it will be understood by those skilled in the art that various changes in form and detail may be made therein without departing from the spirit and scope of the invention.

What is claimed is:

1. A process for producing photographic patterns on a substrate, comprising:
   a. forming a developed silver image in a gelatin coating on the substrate,
   b. applying an aqueous solution of an acid and potassium dichromate to the coating to allow gelatin to remain both at the developed silver image and at the remainder of the substrate area and to remove the developed silver image, and
   c. heating the coating at a temperature of at least 250° C. for a time sufficient to remove selectively the portion of the gelatin coating which contained the developed silver image prior to application of the solution and to harden the remainder of the gelatin coating on the substrate.

2. The process of claim 1 in which the substrate is glass.

3. The process of claim 1 in which the coating is heated at a temperature of from about 375° C. to about 425° C.

4. The process of claim 1 in which the aqueous solution is of sulfuric acid and potassium dichromate.

5. A process for producing photographic patterns on a substrate, comprising:
   a. forming a developed silver image in a gelatin coating on a substrate,
   b. applying an aqueous solution of an acid and potassium dichromate to the coating to allow gelatin to remain both at the developed silver image and at the remainder of the substrate area, and to remove the developed silver image, and
   c. reexposing the coating to form a silver image in the previously unexposed areas of the coating, and
   d. heating the coating at a temperature of at least 250° C. for a time sufficient to harden the silver-containing areas of the coating and to remove the silver-free areas of the coating.

6. The process of claim 5 additionally comprising the steps of:
   e. applying a thin layer of metal over the glass substrate,
   f. applying a dilute metal removing solution to the metal layer for a period sufficient to remove the metal layer from the gelatin image areas but not to impair the metal layer on the glass substrate in the remaining areas, and
   g. applying a gelatin removing liquid to the plate to remove the residual silver gelatin image, the liquid being nonreactive with the metal, to form a metal image on the glass plate corresponding to the original nonimage areas.

7. The process of claim 6 wherein the metal is chromium.

8. The process of claim 7 wherein the metal removing solution is a dilute aqueous hypochlorite solution.

9. The process of claim 7 wherein the gelatin-removing liquid of step (g) is nitric acid.

* * * * *